(No Model.)
J. T. ZIEGLER.
SULKY PLOW.
No. 327,640. Patented Oct. 6, 1885.
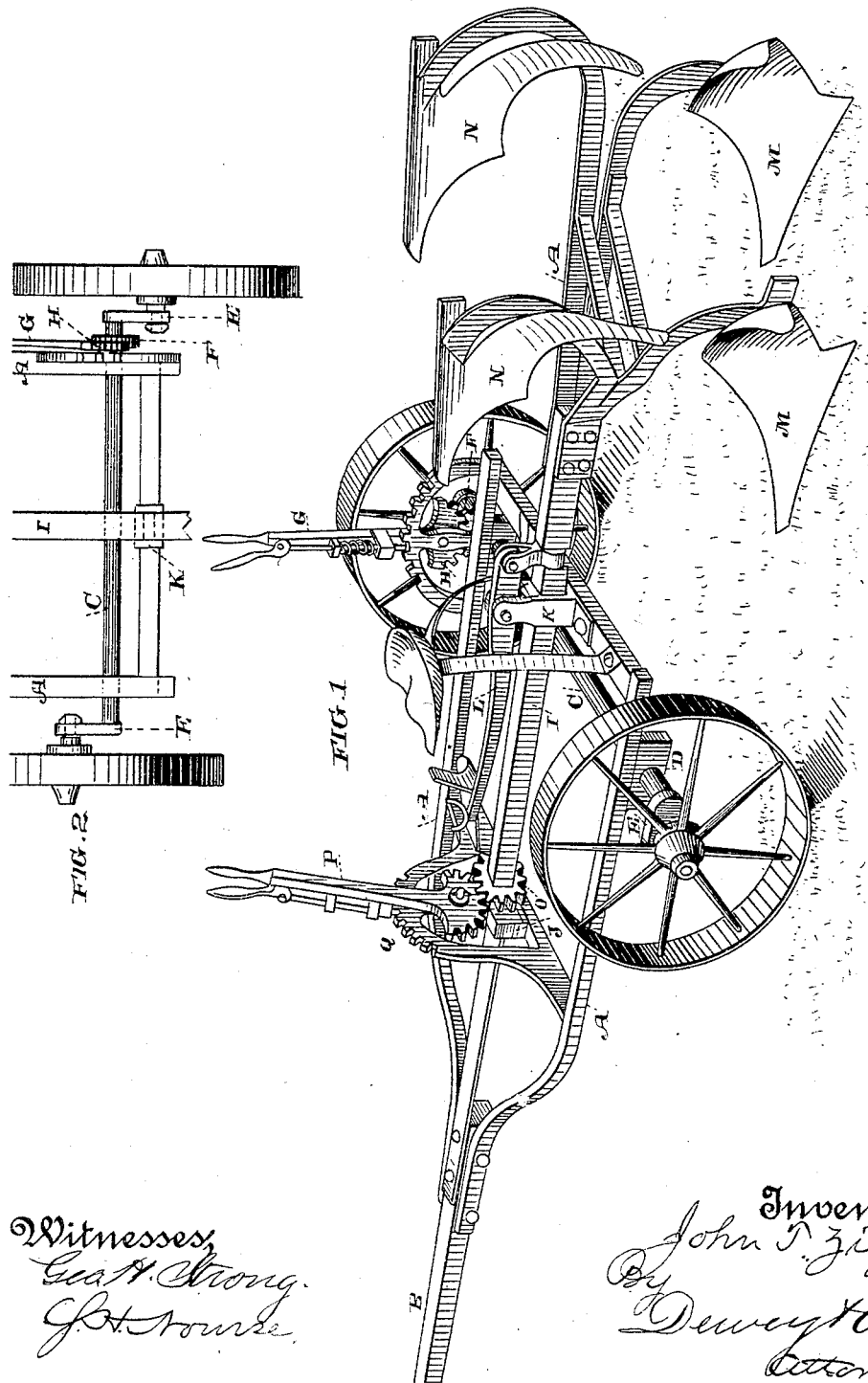
Witnesses,
Geo. H. Strong.
G. H. Rourke.
Inventor,
John T. Ziegler
By Dewey & Co.
Attorneys

UNITED STATES PATENT OFFICE.

JOHN T. ZIEGLER, OF SANTA CRUZ, CALIFORNIA.

SULKY-PLOW.

SPECIFICATION forming part of Letters Patent No. 327,640, dated October 6, 1885.

Application filed April 27, 1885. Serial No. 163,657. (No model.)

*To all whom it may concern:*

Be it known that I, JOHN T. ZIEGLER, of Santa Cruz, Santa Cruz county, State of California, have invented an Improvement in Sulky-Plows; and I hereby declare the following to be a full, clear, and exact description of the same.

My invention relates to an improvement in plows. It is more especially applicable to that class known as "sulky" or "gang" plows.

It consists of two or more plows upon opposite sides of a beam, a means by which said beam may be rotated and held with either of the plows or sets of plows in action, and a means by which the wheel-axle can be rotated so as to throw either wheel downward to make it a furrow-wheel when the plows are working to that side.

It also consists in a means for raising and lowering the plow, all of which will be more fully explained by reference to the accompanying drawings, in which—

Figure 1 is a view of my plow. Fig. 2 is a top view.

A is a plow-frame made in any suitable or desired form, having a tongue, B, projecting from its forward end for the attachment of the team by which the plow is to be drawn.

C is the wheel-axle, which is fitted to turn in journal-boxes D, attached to the frame, and this axle has cranks E, projecting oppositely from the two ends, as shown. Each of these cranks has a pin or spindle upon which one of the wheels is mounted. The cranks are slotted so that the wheels may be adjusted to deep or shallow plowing. Upon this axle, near one side of the frame, is fixed a pinion, F.

A lever, G, is fulcrumed upon the side of the frame and has formed upon or attached to its lower end a segmental rack, H, which engages with the pinion F. When the lever is thrown backward, the segment acts upon the pinion so as to rotate the wheel-shaft in one direction, carrying with it the bearing-wheels, so that one will be depressed and the other elevated by means of the crank-arms upon which they are supported. When the lever is moved in the other direction, this action is reversed, so that the wheel which was depressed will be raised and the other one will be depressed.

A curved rack and the usual spring-pawl serve to hold the lever in either position. When held midway between the two positions, the wheels will be upon the same level, so that the plow may be drawn easily from place to place when not at work.

I is the plow-beam, which has its front end journaled in a box, J, upon the front part of the frame A. It passes through a slot in a vertical post, K, upon the rear portion of the frame, or it may have a journal-box to slide in the slot, if preferred.

A lever, L, is fulcrumed in the top of the post K, and has a link connecting its rear end with the beam, so that when the front end of the lever L is depressed by the foot of the driver it raises the rear end of the beam, and when it is raised it depresses it, there being a sufficient amount of play in the front journal-box to allow this movement.

M and N are the plows, of which there may be two or more to make a single or double gang. These plows are secured to the rear end of the plow-beam, so that when one set are in position to enter the ground the other set will be on the opposite side of the beam and projecting upward into the air.

Upon the front end of the plow-beam, just behind the front journal-box, is fixed a pinion, O, and a lever, P, is fulcrumed to a suitable standard upon the frame just above this pinion, so that the curved or segmental toothed rack which is formed upon or attached to the lower end of the lever may engage the pinion to move it when the lever is moved from side to side. This movement of the lever from one side to the other serves to reverse the plow-beam, carrying with it the plows, so that either the plows M or N may be held in position to enter the soil. A spring-pawl and a curved rack, Q, serve to hold this lever in the desired position. By this construction it will be seen that after the plow has reached one end of the field it may be reversed by simply turning the plow-beam half a revolution, when the opposite set of plows will be ready for service. In this way the plow may work back and forward across the field from one side to the other and no dead furrows will be made.

By the mechanism before described it will been seen when the plows are reversed the wheel-axle is also rotated so as to lower the proper wheel to become the furrow-wheel, the other one being correspondingly raised.

If the plow is to travel from place to place, these wheels are simply brought to a level position and the plow-beam is revolved a quarter of a revolution, so that the two sets of plows will be in a horizontal position and entirely clear of the ground.

Having thus described my invention, what I claim as new, and desire to secure by Letters Patent, is—

1. In a plow, a frame mounted upon bearing-wheels with a central horizontal rotating plow-beam journaled at the front extending rearwardly through the slotted standard and having the plows M and N secured to it, in combination with a lever, whereby the rear portion may be raised and lowered, substantially as herein described.

2. In a plow, a frame mounted upon wheels having a central horizontal plow-beam with its front end journaled to the front of the frame in a loose box which will permit its rear end to be elevated or depressed about this box as a fulcrum, a toothed segment and lever connected with the beam at this point by which it may be reversed, a slotted guide inclosing the rear portion of the beam, and a lever by which the rear end may be raised and depressed, in combination with bearing-wheels supported upon the oppositely-cranked ends of a straight axle which turns in boxes on the frame, and a pinion secured to the axle with a lever and a toothed segment, whereby the axle may be rotated in its boxes and the relative position of the wheels changed, substantially as herein described.

3. In a plow, a frame mounted upon wheels having a central horizontal plow-beam journaled upon it and extending rearwardly with plows M and N fixed to it, as shown, in combination with a pinion secured to the beam and journaled to the clutch-lever, a toothed segment engaging said pinion, and a holding-spring and notched rack engaging the pawl and serving the double purpose of the fulcrum for the segment and a brace for the frame which supports the front end of the plow, substantially as herein described.

In witness whereof I have hereunto set my hand.

JOHN T. ZIEGLER.

Witnesses:
GEO. H. STRONG,
S. H. NOURSE.